Figure 1:
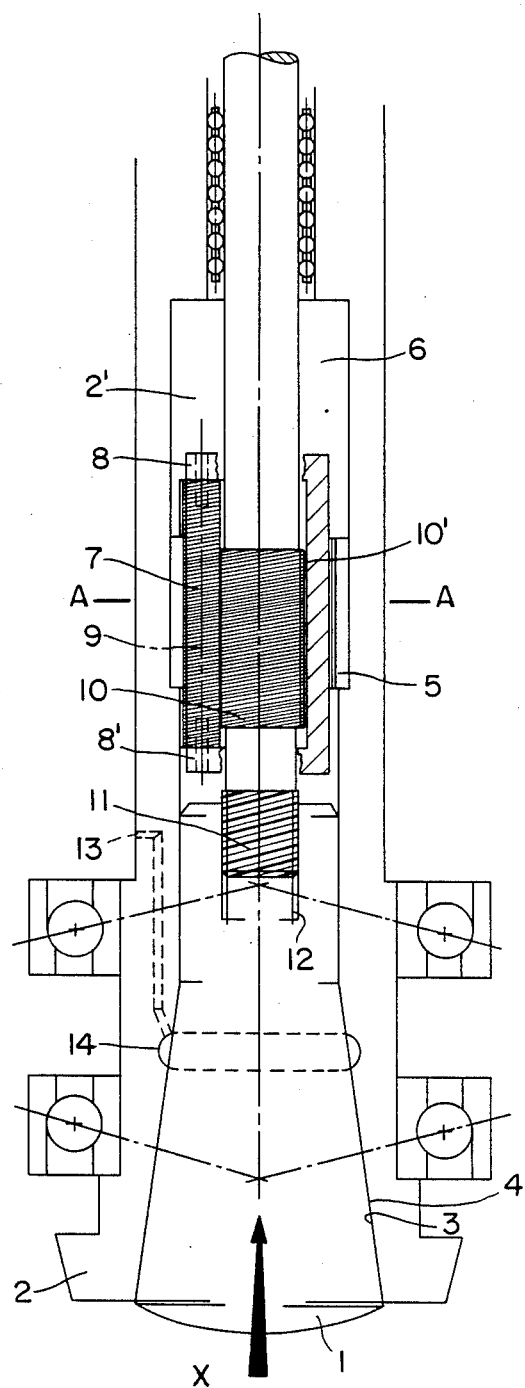

United States Patent [19]

Mantovani

[11] Patent Number: 4,930,956
[45] Date of Patent: Jun. 5, 1990

[54] DEVICE FOR MAKING A MECHANICAL ELEMENT INTEGRAL IN ROTATIONAL MOVEMENT WITH A SECOND EXTERNAL, COAXIAL ELEMENT BY FRICTION

[75] Inventor: Elis Mantovani, Breganzona, Switzerland

[73] Assignee: Tecnodelta S.A., Bioggio, Switzerland

[21] Appl. No.: 307,129

[22] Filed: Feb. 3, 1989

[30] Foreign Application Priority Data

Dec. 20, 1988 [CH] Switzerland .................... 4685/88

[51] Int. Cl.$^5$ .............................................. B23C 5/26
[52] U.S. Cl. ........................................ 409/233; 279/8; 409/231
[58] Field of Search ............... 409/231, 233; 279/7, 279/8

[56] References Cited

U.S. PATENT DOCUMENTS

| 3,185,038 | 5/1965 | Lanzenberger | 409/231 |
|---|---|---|---|
| 3,205,779 | 9/1965 | Walker | 409/233 |
| 3,676,120 | 7/1972 | Nelson et al. | 409/233 |
| 4,777,715 | 10/1988 | Roberts | 409/233 |

FOREIGN PATENT DOCUMENTS 524618  8/1976  U.S.S.R. ............... 409/233

Primary Examiner—Daniel Howell

Attorney, Agent, or Firm—Young & Thompson

[57] ABSTRACT

A coaxial shaft and housing assembly is adapted to be locked against relative rotation. It comprises a housing or hollow motor shaft (2) having a threaded internal cylindrical surface (5) of a first pitch (m), and a coaxial shaft (10) received in the housing (2) and having an intermediate threaded external portion (10') of the same pitch (m). A plurality of stud pins (7), externally threaded with the same first pitch (m) are positioned between the shaft (10) and the internal surface (5) of the housing (2), which stud pins are in meshing engagement both with the portion (10') of the shaft (10) and the surface (5) of the housing (2). The stud pins (7) are freely rotatably mounted in a carriage (9) mounted for axial translation between the inside of the housing (2) and the shaft (10). One end of the shaft (10) has another threaded portion (11) of a second pitch (n) greater than the first pitch, and is received in a corresponding socket (12) of an arbor (1) fitted in the corresponding end of the housing or hollow motor shaft (2). The corresponding ends of the housing (2) and arbor (1) fitted therein have cooperating friction surfaces (4, 3) such that when the friction surfaces are brought into contact by screwing shaft (10) into socket (12) a further rotation of the shaft (10) will promote, through the different threading pitches (m and n), a tight locking action due to axial translation of the stud pins (7) within the housing (2).

3 Claims, 2 Drawing Sheets

DEVICE FOR MAKING A MECHANICAL ELEMENT INTEGRAL IN ROTATIONAL MOVEMENT WITH A SECOND EXTERNAL, COAXIAL ELEMENT BY FRICTION

The object of the invention is a device for making a mechanical element integral in rotational movement with a second element that is external and coaxial to it by friction which is generated between two friction zones of the two elements themselves as a result of an axial traction exerted on the inside element.

The device comprises a hollow cylindrical bushing, internally threaded with pitch m, wedged in the inside cylindrical cavity of the outside element. Stud pins are provided which rotate tangentially to the threading of this bushing, adhering by friction due to a deliberate interference between the diameters of their threading with that of the bushing. The stud pins are also threaded with pitch m, and are supported at their ends by the outside rings of a cylindrical housing. These stud pins are free to rotate around their own axes as a result of the movement imparted to them by friction from the interference between the threadings upon rotation of a shaft, which shaft is also threaded with pitch m. The shaft has an axis of rotation coincident with that of the cylindrical housing, and also has a threaded end with pitch n greater than pitch m that screws into the threaded hole of the inside element.

By the effect of the rotation of the shaft, during its screwing into the hole, there are caused an axial approaching movement of the inside element against the outside element and a rotation in the opposite direction of the threaded pins about their own axes. The pins in turn engage by friction of their own threads on the threading of the bushing, and thus translate, together with their associated housing, along the direction of the longitudinal axis of the inside element, until the friction surfaces of the two elements have come in contact. Then, a further rotation of the shaft in the screwing direction, by the resulting rotation of the threaded pins, causes, by the effect of the difference between pitches m and n of the different threadings, an axial traction of deliberate intensity on the inside body and consequently a desired contact pressure between the friction surfaces and the resulting locking of the two elements.

The usefulness and reliability of the device become evident if, for clearness of explanation, a particular application is considered. For example, the two mechanical elements to be locked can be a machine tool arbor, to which is to be transmitted without slipping and vibrations the movement supplied by a cylindrical element, external and coaxial to it, for example, the rotating hollow shaft of an electric motor, or a motor of another type.

To effect this fastening, locking systems now in use adopt clamps that hold the arbor by engaging around its suitably shaped shank. The traction necessary to provide the desired pressure to the two friction surfaces of the arbor and drive shaft, respectively, is provided by exerting a traction force sufficient to generate the friction necessary for transmission of the movement, by systems of springs or the like.

These systems exhibit two main limitations of their functionality and reliability. First, since dimensionally excessive or bulky structures cannot be constructed by spring means or the like, the traction force that can be exerted is limited, and not always such as to assure a perfect rigidity of transmission of the movement, i.e., without relative slipping or vibrations. Second, also for dimensional reasons, the shaped part gripped by the clamps necessarily exhibits a narrowing of the section which often triggers fatigue breaking phenomena as a result of the torsional-bending stresses to which the arbor is subjected during its work and during the sudden insertion operations caused by automatic coupling elements.

The device according to the present invention solves both of these problems, as will be explained below.

Figure 2:
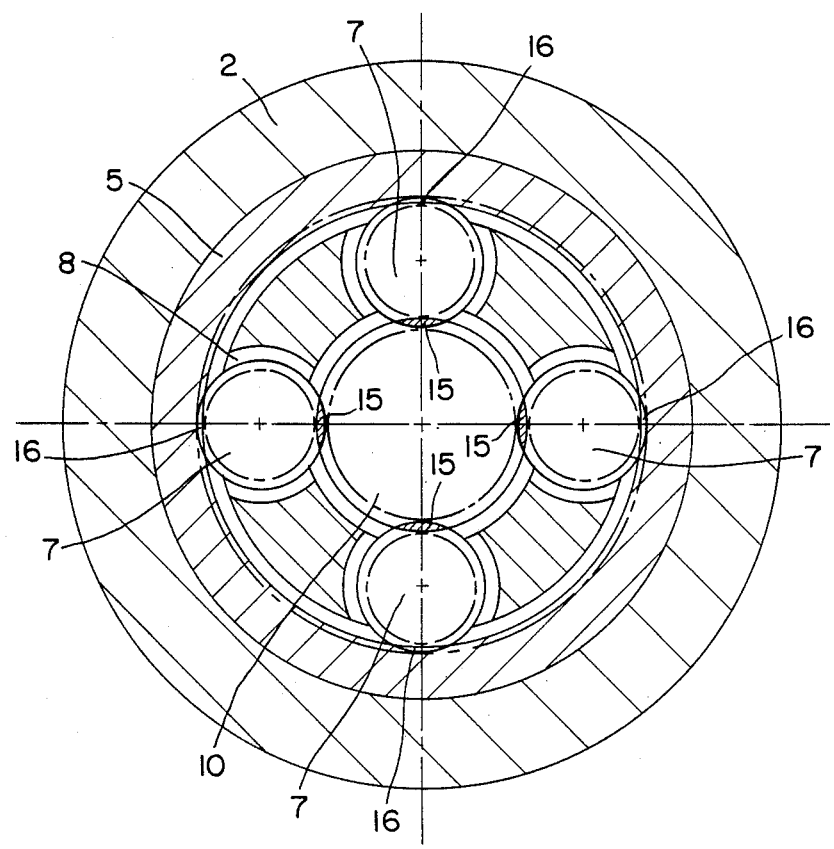

In the drawings, FIG. 1 represents a view in longitudinal section of an arbor-shaft motor-locking device unit; and FIG. 2 is a sectional view along line A—A of FIG. 1.

Arbor 1 and hollow motor shaft 2 remain integral during rotation by the friction that is generated between their respective friction surfaces 3, 4. This friction is generated by the traction that is exerted on arbor 1 (see arrow X in FIG. 1) as follows:

A threaded blind hole 12 with threading of pitch n is made in the end part of the arbor 1. In this hole is screwed threaded end 11 of arbor 10, which arbor 10 also carries on its surface a threaded portion 10' with threading of pitch m. Threaded pins 7 engage in this threading by rotating about their own axes by the friction generated by a deliberate interference between the diameters of their threadings with threaded portion 10' of shaft 10. The threaded pins 7, also with pitch m, are variable in number depending on the dimensional requirements, and are supported at the ends of end rings 8, 8' of a cylindrical housing 9, but are free to rotate about their own axes.

During the operation of screwing of threaded end 11 of shaft 10 in threaded hole 12 of the arbor 1, these threaded pins 7 therefore rotate, due to said interference, in the direction opposite to that of shaft 10, inside bushing 5. This bushing 5 is wedged inside cavity 2' of the drive shaft and is also threaded with the same pitch m as pins 7, and threaded portion 10' of shaft 10. The rotation of threaded pins 7, relative to threaded bushing 5, causes the translation of housing 9 and of the pins integral with it in the direction parallel to the longitudinal axis of shaft 10.

At the moment which the two friction surfaces 3, 4 come in contact, a further rotation in screwing of shaft 10, through the action of the further movement of the threaded pins and of the difference between pitches m and n of the threadings, causes locking of arbor 1 to hollow shaft 2 of the motor.

Because of the small angle of inclination of the spiral of the threading, which is much less than the friction angle of the material, this locking is irreversible unless a suitable countermaneuver of unscrewing and unlocking is performed.

The traction force exerted in locking is distributed over all the numerous points of contact 15, 16 (see FIG. 2) between the threads of pins 7 and of bushing 5 and therefore can be very high, in practice a function only of the resistance to traction of the diametral section of shaft 10.

It should be noted that the locking forces affect a limited, concentrated portion of the hollow shaft 2 of the motor, without imparting stresses to the other elements.

With the locking device according to the invention it is also very easy to avoid the serious risk of violent expulsion of the arbor from the motor during movement, in case of an accidental loosening of the locking.

With the provision of a simple annular cavity 14 made in friction surface 4 of hollow shaft 2 connected to sensors 13, for example of the pneumatic variety and having a desired sensitivity, and with the slightest clearance being created between the two friction surfaces 3, 4, it is easy to control by said sensors the immediate stopping of the motor, well before a complete unscrewing of end 11 of shaft 10 from hole 12 of the arbor shank 1 occurs.

It is obvious that the system of locking between two mechanical elements according to the invention can be extended to any type of other pertinent application and, therefore, the figures represents only a preferred embodiment, without in any way being binding or limiting of the possibilities of use of the device under consideration.

It should be noted that the clockwise and counterclockwise directions of the various threadings have not been indicated, since their selection is free depending on requirements, if the correct kinematic functioning of the entire device remains unchanged.

I claim:

1. A coaxial shaft and housing assembly adapted to be locked against relative rotation, comprising a housing (2) having a threaded internal cylindrical surface (5) of a first pitch (m); a coaxial shaft (10) received in said housing (2) and having an intermediate threaded external portion (10') of said first pitch (m), said intermediate threaded external portion (10') being spaced from said threaded internal cylindrical surface (5); a plurality of stud pins (7) having axes substantially parallel to the axis of shaft (10), said stud pins (7) having external threading of said first pitch (m) and being in meshing engagement with both said intermediate threaded external portion (10') and said threaded internal cylindrical surface (5), said stud pins (7) being freely rotatably mounted in a carriage (9) disposed for axial translation within said housing (2) along said shaft (10); and an arbor (1) fitted in one end of said housing (2); said shaft (10) further comprising an end (11) having external threading of a second pitch (n), said arbor (1) comprising a socket (12) having internal threading of said second pitch (n), and said housing (2) and said arbor (1) having cooperating tapered surfaces adapted to promote a progressively increasing frictional engagement upon axial insertion of said arbor (1) into said housing (2); whereby screwing of said threaded end (11) into said threaded socket (12) causes said arbor (1) to approach axially said housing (2) while causing said stud pins (7) to rotate about their axes in meshing engagement with both said intermediate threaded external portion (10') and said threaded internal cylindrical surface (5), thereby causing axial translation of said plurality of stud pins (7) and associated carriage (9) within said housing (2), and whereby, upon contact of said cooperating tapered surfaces of said housing (2) and said arbor (1), further screwing of said shaft (10) into said socket (12) causes, due to the difference between said first and second pitches (m and n), an axial traction on said arbor (1) into said housing (2) and thus a desired contact pressure between said cooperating tapered surfaces (3, 4).

2. A coaxial shaft and housing assembly according to claim 1, further comprising sensing means (13) for detecting contact between said cooperating tapered surfaces (3, 4).

3. A coaxial shaft and housing assembly according to claim 1 in combination with a motor, said housing (2) being a hollow motor shaft adapted to be driven in rotation by said motor.

* * * * *